United States Patent [19]

Omote et al.

[11] 4,420,057

[45] Dec. 13, 1983

[54] AIR INDUCTION STRUCTURE FOR AN AUTOMOBILE AIR CLEANER

[75] Inventors: Kazuaki Omote, Fujisawa; Masayoshi Hayashida, Yokohama, both of Japan

[73] Assignee: Nissan Motor Company, Limited, Yokohama, Japan

[21] Appl. No.: 294,808

[22] Filed: Aug. 20, 1981

[30] Foreign Application Priority Data

Oct. 31, 1980 [JP] Japan .................................. 55-155897

[51] Int. Cl.³ .............................................. B60K 13/02
[52] U.S. Cl. ................................. 180/54 A; 180/68 P; 180/69 C; 123/41.7
[58] Field of Search ................. 180/54 A, 68 P, 69 R, 180/69 C, 69.01; 123/41.7, 198 E; 98/2.05

[56] References Cited

U.S. PATENT DOCUMENTS

| | | | |
|---|---|---|---|
| 2,881,860 | 4/1959 | Ternes | 180/69 R |
| 3,481,117 | 12/1969 | McKinlay | 180/68.3 |
| 4,212,659 | 7/1980 | Magrini | 55/385 B |
| 4,235,298 | 11/1980 | Sackett | 180/54 A |
| 4,326,865 | 4/1982 | Siebels | 55/385 B |

FOREIGN PATENT DOCUMENTS

| | | |
|---|---|---|
| 2913648 | 10/1980 | Fed. Rep. of Germany ..... 180/68.1 |
| 1017885 | 1/1966 | United Kingdom . |
| 1166356 | 10/1969 | United Kingdom . |
| 2003982 | 3/1979 | United Kingdom . |
| 2011273 | 7/1979 | United Kingdom . |
| 2059288 | 4/1981 | United Kingdom . |

*Primary Examiner*—David M. Mitchell
*Assistant Examiner*—Joseph McCarthy
*Attorney, Agent, or Firm*—Lane, Aitken & Kananen

[57] ABSTRACT

An air induction structure is designed for an air cleaner on an automobile furnished with an engine compartment in its front body and a grille at its front end through which the engine compartment is open to the outside. The air induction structure includes an obstructing member, which is located in a position in which the obstructing member is across the substantially straight path connecting the opening of an air intake duct, connected to the air cleaner, and the part of the grille in the same vertical longitudinal planes, with respect to the automobile, as the opening of the air intake duct, so that the obstructing member prevents air, drawn into the engine compartment through the part of the grille, from traveling straight into the opening of the air intake duct.

4 Claims, 3 Drawing Figures

AIR INDUCTION STRUCTURE FOR AN AUTOMOBILE AIR CLEANER

BACKGROUND OF THE INVENTION

1. Field of the Invention

This invention relates to an air induction structure for an automobile air cleaner.

2. Description of the Prior Art

An air cleaner filtering out dirt and dust from air being supplied to an engine is usually located within an engine compartment in the front of an automobile body. An air intake duct connected to the air cleaner is conventionally arranged so that air drawn into the engine compartment through a grille or a gap between the hood and the grille may flow more-or-less straight to the opening of the air intake duct. Such a conventional air intake duct is liable to draw rain water, snow, and particularly water and mud thrown up by preceding automobiles, along with the air, because the air flows straight to the opening of the air intake duct along a relatively short path.

SUMMARY OF THE INVENTION

It is an object of the present invention to provide an air induction structure for an automobile air cleaner, which prevents water, snow, mud, and the like entering thereinto.

The air induction structure of the present invention is designed for an air cleaner on an automobile furnished with an engine compartment in its front body and a grille at its front end through which the engine compartment is open to the outside. The air cleaner is located in the engine compartment. The air induction structure includes an air intake duct located in the engine compartment. The air intake duct is connected at one end to the air cleaner and is open at its other end to supply the air cleaner with air. The air induction structure also includes an obstructing member located in a position in which the obstructing member is across the substantially straight path connecting the opening of the air intake duct and the part of the grille in the same vertical longitudinal planes, with respect to the automobile, as the opening of the air intake duct. This obstructing member prevents air, drawn into the engine compartment through the part of the grille, from travelling straight into the opening of the air intake duct.

The above and other objects, features and advantages of the present invention will be apparent from the following description of a preferred embodiment thereof, taken in conjunction with the drawings.

DESCRIPTION OF THE PREFERRED EMBODIMENT

Figure 1:
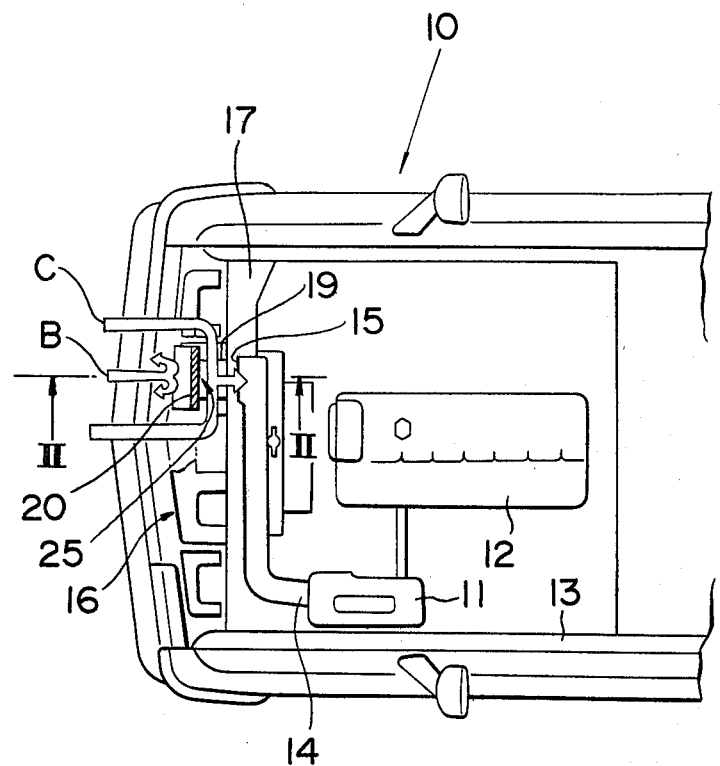
FIG. 1 is a partially-broken plan view of an automobile equipped with an air induction structure of the present invention designed for an automobile air cleaner, where the hood is omitted for convenience sake.
Figure 2:
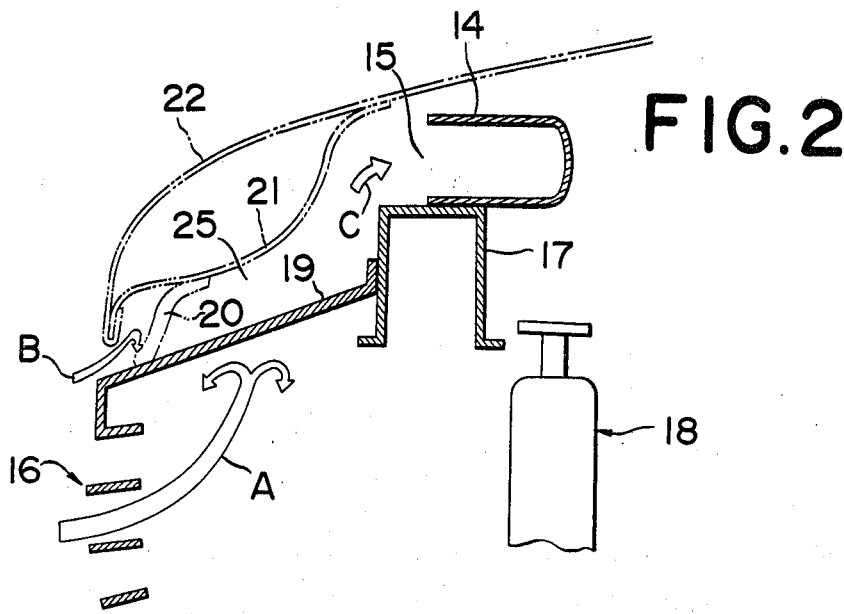
FIG. 2 is a diagrammatic section taken along the line II—II of FIG. 1.
Figure 3:
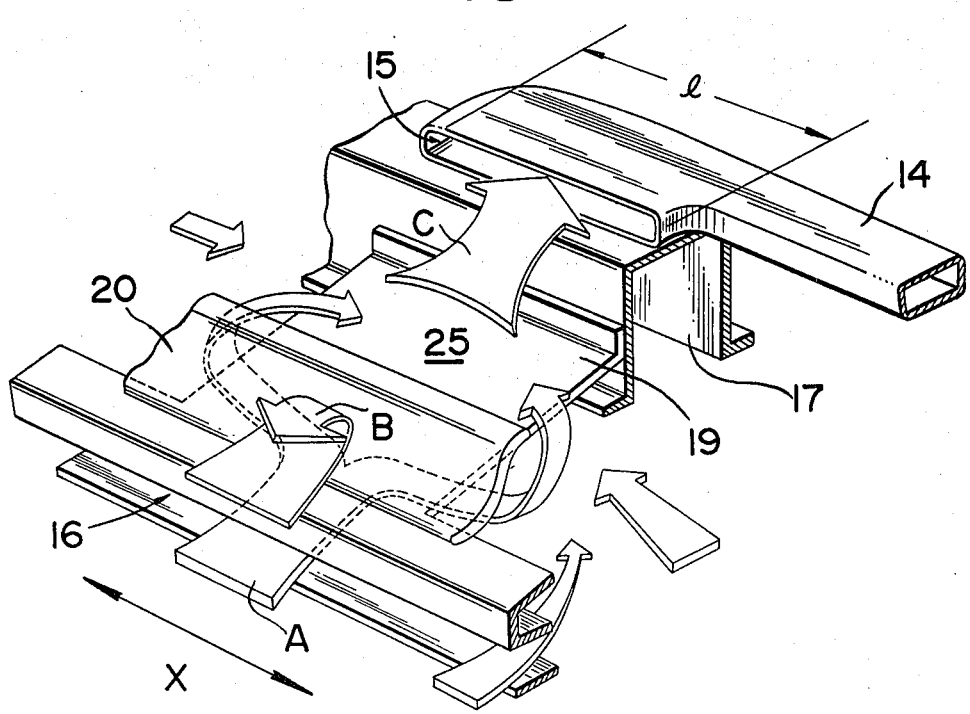
FIG. 3 is a partially-broken and enlarged perspective view of the air induction structure of FIG. 1, where the letter X designates the lateral direction with respect to the automobile.

With reference to FIGS. 1 to 3, there is shown an automobile 10 equipped with an air induction structure for an air cleaner 11 filtering out dirt and dust from air to supply clean air to an engine 12. The air cleaner 11 is located within the engine compartment in the front of the automobile 10, between the engine 12 and a wing panel 13 of the automobile 10, close to the wing panel 13.

An air intake duct 14 is attached to the air cleaner 11 to supply the same with air. In the engine compartment, the air intake duct 14 extends forward from the air cleaner 11 and then laterally with respect to the automobile 10 to its opening 15 near the longitudinal center line of the automobile 10. The opening 15 of the air intake duct 14 extends laterally to point forward as an inlet to admit air thereinto effectively and is in a position higher than the top of a grille 16 attached to the front end of the automobile 10 to admit air into the engine compartment from the outside. This positioning helps prevent water, snow, mud, and the like, drawn into the engine compartment through the grille 16, from entering the opening 15 of the air intake duct 14 by gravity. The lateral part of the air intake duct 14 is carried on the top of a laterally extending, inverted-U shaped section radiator core support 17 of a radiator assembly 18.

Between the opening 15 of the air intake duct 14 and the upper end of the grille 16 are provided first and second obstructing members 19 and 20 for diverting the air flow to the opening 15 of the air intake duct 14. The first member 19 is formed integrally with the grille 16 so as to extend longitudinally or backward from the upper end of the grille 16 to the front face of the radiator core support 17 to be attached to the same. The first member 19 is of a rectangular shape with a width corresponding to a width (which is designated by the letter *l* in FIG. 3) of the opening 15 of the air intake duct 14. The first member 19 inclines slightly upward from the front to the rear and is directly in front of but below the opening 15 of the air intake duct 14 so as to be located in a position in which the first member 19 is across the substantially straight path connecting the opening 15 and the part of the grille 16 directly in front of but below the opening 15, in order to obstruct the stream of air, drawn through the part of the grille 16 into the engine compartment, to the opening 15 of the air intake duct 14. Thus, the air flow through the part of the grille 16 directly in front of but below the opening 15 is bent outward to separate into two opposite streams below the first member 19, and then the opposite streams are bent inward to pass over the sides of the first member 19 and join together above the first member 19 to form a resultant stream entering the opening 15 of the air intake duct 14, as shown by the arrows A and C in FIGS. 1 to 3. The first member 19 may be formed separately from the grille 16. Moreover, the first member 19 may be located in any position in which the first member 19 is across the substantially straight path connecting the opening 15 of the air intake duct 14 and the part of the grille 16 in the same vertical longitudinal planes, with respect to the automobile 10, as the opening 15 so that the first member 19 prevents air, drawn into the engine compartment through the part of the grille 16, from travelling straight into the opening 15.

The second member 20 is of a substantially rectangular shape positioned so that its length is parallel to the width of the automobile 10 and slightly greater than the width of the opening 15 of the air intake duct 14. The second member 20 is preferably made of a soft or flexible material such as rubber. The upper end of the second member 20 is throughout attached to a panel 21 fixed to the inner surface of a pivoted hood 22 covering the engine compartment so that the lower end of the second member 20 throughout abuts against the top end of the grille 16 when the hood 22 is closed. The hood 22 is generally designed so as to leave a laterally extending gap just above the grille 16 when the hood 22 is closed, to allow air to enter the engine compartment through the gap as well as through the grille 16. The second member 20 inclines upward from the front to the rear and is directly in front of but below the opening 15 of the air intake duct 14 when the hood 22 is closed, so as to impede the stream of air, admitted into the engine compartment through the gap between the front of the hood 22 and the top of the grille 16, in its passage to the opening 15 of the air intake duct 14. Thus, the air flow through the gap between the hood 22 and the grille 16 directly in front of but below the opening 15 is prevented from travelling straight into the opening 15 of the air intake duct 14, as is shown by the arrow B in FIGS. 1 to 3. The lower end of the second member 20 may be attached to the upper end of the grille 16 instead of being attached to the hood panel 21. Moreover, the second member 20 may be located in any position in which the second member 20 is across the substantially straight path connecting the opening 15 of the air intake duct 14 and the gap between the hood 22 and the grille 16 in the same vertical longitudinal planes, with respect to the automobile 10, as the opening 15 so that the second member 20 prevents air, drawn into the engine compartment through the gap, from travelling straight into the opening 15.

The first and second members 19 and 20 are so arranged that the first and second members 19 and 20, the hood panel 21, and the radiator core support 17 can define an air passage 25 which leads to the opening 15 of the air intake duct 14 and which is open above the sides of the first member 19. As described above, the first and second members 19 and 20 obstruct and prevent the stream of air, admitted into the engine compartment through the grille 16 or the gap between the hood 22 and the grille 16 substantially in front of the opening 15 of the air intake duct 14, from travelling straight into the opening 15. As a result of this, the stream of air is bent to make a detour and travels through the air passage 25 to enter the opening 15 of the air intake duct 14. The first and second members 19 and 20 then may capture most of the water, snow, mud, and the like when they are drawn into the engine compartment along with the stream of air. Air is also able to enter the engine compartment through the grille 16 or the gap between the hood 22 and the grille 16 away from the first and second members 19 and 20. Since this air needs to travel a relatively long way to the opening 15 of the air intake duct 14 through the air passage 25, most of the water, snow, mud, and the like drawn into the engine compartment along with the air may be prevented from entering the opening 15 anyway by gravity. The prevention of the entrance of water, snow, mud, and the like into the air cleaner 11 may ensure the satisfactory operation of the air cleaner 11 or the engine 12.

It should be understood that further modifications and variations may be made in the present invention without departing from the spirit and scope of the present invention as set forth in the appended claims.

What is claimed is:

1. An air induction structure for an air cleaner on an automobile, the automobile being furnished with an engine compartment in its front body and a grille at its front end through which the engine compartment is open to the outside to introduce air thereto, the automobile being also furnished with a pivoted hood for covering the engine compartment from above, the hood being designed to form a gap between the top of the front of the automobile and the hood when the hood is closed, to draw therethrough air into the engine compartment, the structure comprising:

(a) an air intake duct located in the engine compartment, the air intake duct being connected at one end to the air cleaner and being open forward at its other end to conduct air to the air cleaner;

(b) a first obstructing member extending across a first longitudinally and vertically extending straight path connecting part of the grille and the opening of the air intake duct to block the first path, the first obstructing member extending longitudinally from the upper end of the grille; and (c) a second obstructing member extending across a second longitudinally and vertically extending straight path connecting part of the grille and the opening of the air intake duct to block the second path, the second obstructing member extending from the upper end of the grille to the hood when the hood is closed;

(d) the first and second obstructing members defining an air passage in conjunction with the hood when the hood is closed, the air passage being open above both of the sides of the first obstructing member and leading to the opening of the air intake duct so that the air drawn into the engine compartment via the gap and the grille can enter the air passage via both of the openings thereof and be conducted to the opening of the air intake duct through the air passage.

2. An air induction structure as recited in claim 1, wherein the first obstructing member inclines upward from the front to the rear with respect to the automobile.

3. An air induction structure as recited in claim 1, further comprising a support carrying the air intake duct on its top, the first obstructing member extending to the support, the support defining the air passage in conjunction with the first and second obstructing members, and the hood.

4. An air induction structure as recited in claim 1, wherein the second obstructing member is made of flexible material and is attached to the hood.

* * * * *